UNITED STATES PATENT OFFICE.

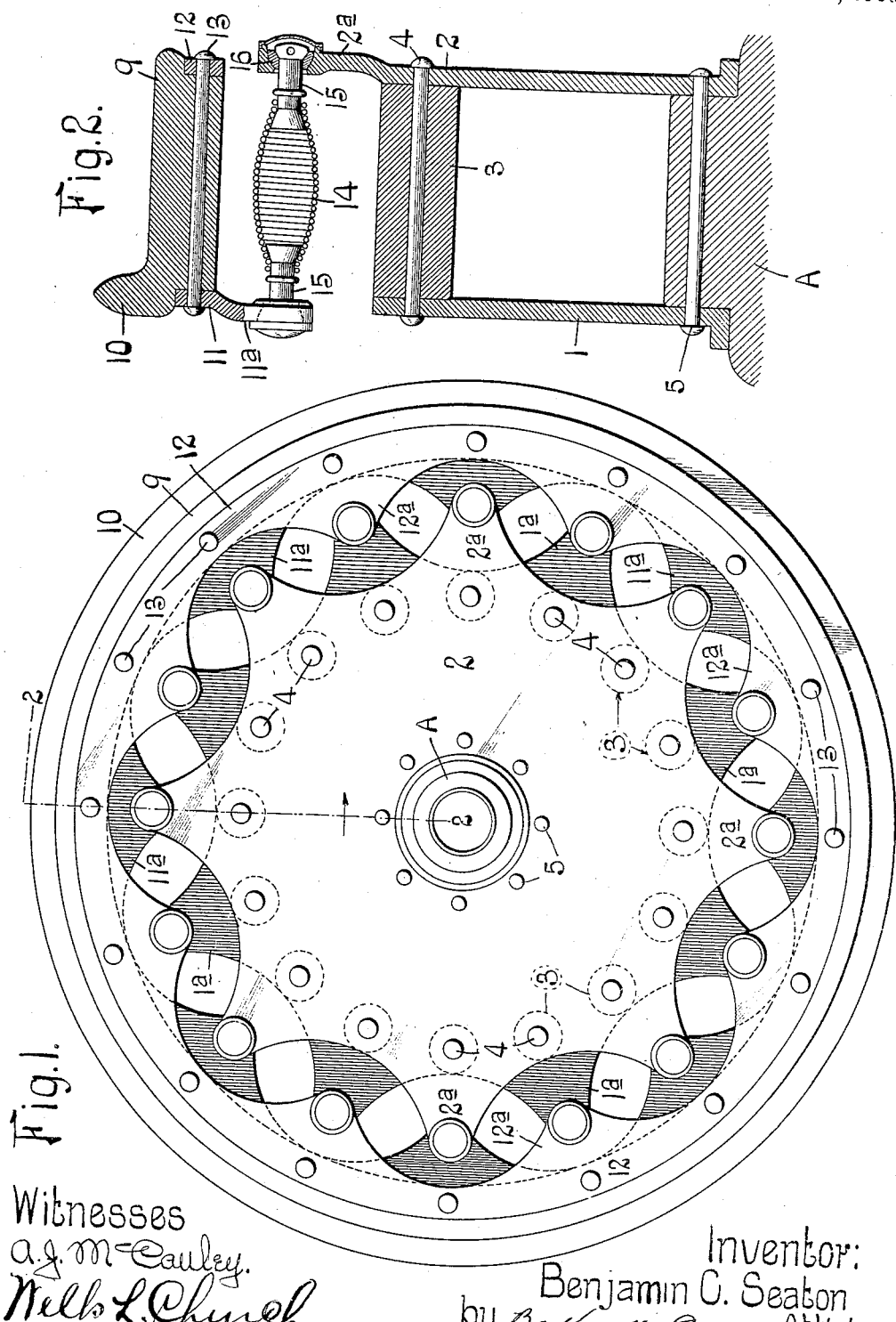

BENJAMIN C. SEATON, OF DETROIT, MICHIGAN.

WHEEL.

No. 912,627.　　Specification of Letters Patent.　　Patented Feb. 16, 1909.

Application filed September 13, 1907. Serial No. 392,704.

*To all whom it may concern:*

Be it known that I, BENJAMIN C. SEATON, a citizen of the United States, residing at Detroit, Michigan, have invented a certain new and useful Improvement in Wheels, of which the following is a full, clear, and exact description, such as will enable others skilled in the art to which it appertains to make and use the same, reference being had to the accompanying drawings, forming part of this specification, in which—

Figure 1 is a side elevation of a wheel embodying the features of my invention; and Fig. 2 is a sectional view taken on the line 2—2 of Fig. 1.

This invention relates to wheels, and particularly to the type of wheel shown in my prior United States patent No. 814,737, dated March 13, 1906. The wheel shown in said patent comprises a hub section that consists of a hub, spokes and a felly connected to the ends of the spokes, an outer rim which carries the tire or tread of the wheel and transversely extending tension springs connected to the outer rim and to the felly of the hub section in such a manner that the tension of the springs is equally distributed circumferentially around the wheel.

The object of my present invention is to provide a wheel of the general type above referred to but in which the hub section consists of a hub and a central supporting member formed by a plurality of metal plates that are permanently secured to the hub and which are provided adjacent their peripheries with arms or projections to which the tension springs are connected at one end.

I have herein shown the preferred form of my invention as consisting of a wheel which is provided with a flanged metal tread so as to enable the wheel to be used on railway rolling stock but I wish it to be understood that I do not consider the invention herein described as being limited to a car wheel as the outer rim of the wheel may be provided with a rubber tread or any other form of tread.

Referring to the drawings which illustrate the preferred form of my invention, 1 and 2 designate metal plates or disks, preferably formed of sheet metal, which are permanently secured to a hub A to form a central supporting member. The plates 1 and 2 are spaced apart, as shown in Fig. 2, by means of cores or fillers 3 and are securely fastened together by bolts or rivets 4 which pass through the plates and fillers. The plates are preferably connected to the hub by fastening devices 5 which pass through the hub but it will, of course, be understood that the plates could be secured to the hub in various ways without departing from the spirit of my invention.

In the construction herein shown the tread of the wheel consists of an outer rim 9 provided with an integral rail flange 10 but it will, of course, be understood that other types of treads could be used without departing from the spirit of my invention. Metal plates 11 and 12 are connected to side edges of the outer rim 9 by means of fastening devices 13 and said plates carry projections or arms $11^a$ and $12^a$ that project inwardly toward the hub of the wheel, said arms being so disposed that the arms on the plates 11 and 12 will be staggered with relation to each other, as shown in Fig. 1. The plates 1 and 2 also carry arms $1^a$ and $2^a$ that project toward the outer rim 9, and said arms $1^a$ and $2^a$ are also staggered, that is to say, the arms $1^a$ are arranged intermediate the arms $2^a$. The arms $11^a$ and $12^a$ on the outer rim are so disposed relatively to the arms $1^a$ and $2^a$ on the central supporting member of the hub section that the arms $11^a$ will be disposed oppositely to the arms $2^a$ on the plate 2 and the arms $12^a$ will be disposed oppositely to the arms $1^a$ on the plate 1, and in the construction herein shown said coöperating arms are formed integral with the members that carry them.

Transversely arranged tension springs 14 are connected to the coöperating projections or arms on the plates 1 and 2 and the plates 11 and 12 preferably by devices 15 fastened to ball members 16 that are mounted in sockets in the projections or arms so as to form universal joints, as shown clearly in Fig. 2. In a wheel constructed in this manner the springs will normally all be arranged in horizontal planes, but slightly under tension, because the points of attachment will be diametrically opposite each other. However, when pressure is applied to the wheel the tendency of the lower portion of the wheel to place the lower series of springs under tension will be communicated throughout the wheel and all of the springs will be placed under approximately the same amount of tension, so that the resiliency will be distributed circumferentially around the outer edge of the central supporting member of the wheel. This equal distribution of the tension on the springs is due to the fact that the outer rim is provided with fixed securing points; that is to say, the securing points for the springs on the outer rim do not change under any condition, but the securing points for the springs on the central supporting member of the hub section move relatively to the outer rim in proportion to the amount of weight applied to the wheel. When the springs are under abnormal tension, they are alternately inclined in such a manner that each alternate spring is inclined in a direction opposite to the adjacent ones. Hence the provision for resisting the circumferential thrust as well as the provision for the side thrust of the axle is made.

Having thus described my invention, what I claim as new and desire to secure by Letters Patent is:

1. A wheel comprising a hub, metal plates secured to said hub and spaced away from each other by cores or fillers, an outer rim provided with inwardly projecting arms that are staggered with relation to each other and which are arranged adjacent the opposite side edges of said rim, arms on said plates disposed oppositely to the arms on the rim, and transversely extending tension springs each of which is connected at one end to an arm on the rim and at its opposite end to an arm on one of said plates; substantially as described.

2. A wheel comprising a central supporting member consisting of a hub, a pair of metal plates connected to said hub, each of which is provided on its periphery with a plurality of integral arms, the arms on one plate being staggered with relation to those on the other plate, an outer rim provided with inwardly projecting arms which are arranged oppositely to the arms on said plates, and transversely extending tension springs, each of which is connected at one end to an arm on the rim, and at its other end to an arm on one of said plates; substantially as described.

3. A wheel comprising a central supporting member which consists of a hub having a pair of metal plates secured thereto, integral arms projecting radially from said plates, the arms on one plate being staggered with relation to the arms on the other plate, an outer rim, plates secured to the side edges of said rim and provided with integral inwardly extending projections which are disposed oppositely to the arms on the central supporting member, transversely extending tension springs, each of which is interposed between one of said projections and one of said arms, and means for retaining said spring in position; substantially as described.

In testimony whereof I hereunto affix my signature in the presence of two witnesses, this tenth day of September 1907.

BENJAMIN C. SEATON.

Witnesses:
  WELLS L. CHURCH,
  GEORGE BAKEWELL.